Dec. 6, 1938.  L. L. SALFISBERG  2,139,039
FORMING AND FILLING BAGS
Filed Nov. 21, 1936
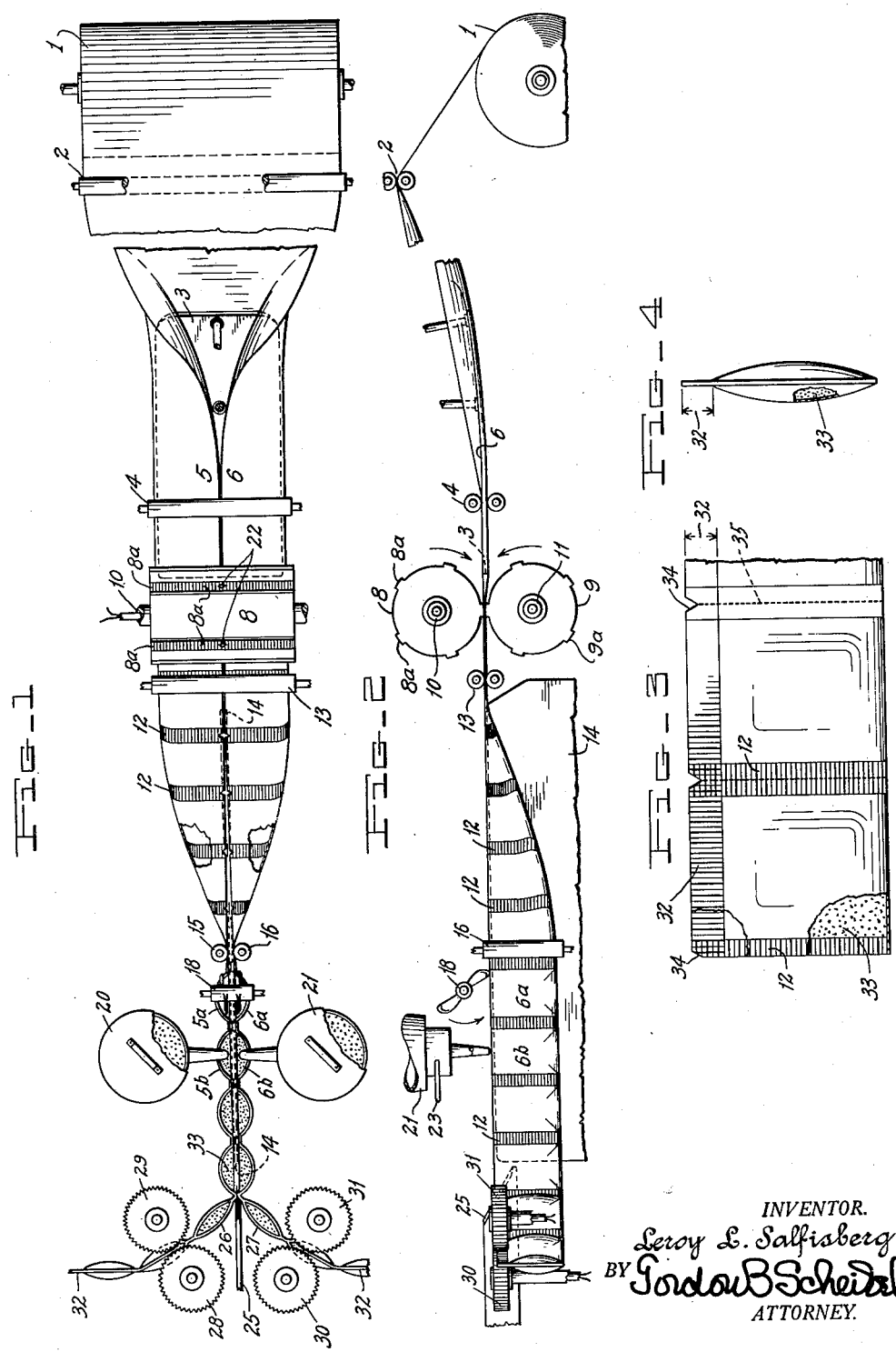
INVENTOR.
Leroy L. Salfisberg
BY Gordon B Scheitel
ATTORNEY.

Patented Dec. 6, 1938

2,139,039

UNITED STATES PATENT OFFICE 2,139,039

FORMING AND FILLING BAGS

Leroy L. Salfisberg, South Orange, N. J., assignor to Ivers-Lee Company, Newark, N. J., a corporation of Delaware Application November 21, 1936, Serial No. 112,113

6 Claims. (Cl. 93—3)

This invention relates in general to the fabrication of bags and specifically relates to a system and method of manufacturing bags by a heat sealing process.

The principal object of the invention comprises providing a simplified arrangement for forming and filling commodity containing bags and the like.

A further object of the invention comprises providing an automatic system and method for fabricating plural bags in contiguous chain formation.

A still further object of the invention comprises providing a system for feeding heat sealable packaging material to form multiple bag formations in transversely and longitudinally extending rows.

A still further object comprises providing an automatic bag making, filling and sealing machine for producing individual commodity containing bags.

These and other objects will be apparent from the following, reference being had to the accompanying drawing in which like reference numerals designate corresponding parts and in which:

Fig. 1 is a top plan view of one embodiment of the bag fabricating system of the invention;

Fig. 2 is a side view of the representation of Fig. 1;

Fig. 3 is a view of a bag fabrication in accordance with the invention; and

Fig. 4 is an end view of the fabrication depicted in Fig. 3.

The invention contemplates providing a system for feeding strip-like packaging material, such as transparent regenerated cellulose with a thermoplastic coating thereon, through apparatus for forming, filling and sealing plural bag formations. In accordance with the invention, the strip of packaging material is folded and sealed to produce parallel rows of bag formations which are subsequently filled with the desired commodity. The parallel rows of filled bags are then sealed and separated to produce independent chain bag formations. These chain bag formations may be individually packed for subsequent individual separation and use of the enclosed commodities.

Referring to the drawing in detail, a roll of packaging material 1 is fed over idler rollers 2. The packaging material 1 is preferably of transparent regenerated cellulose having a thermoplastic coating on the upper or outer surface thereof, although other sealable materials may be used in accordance with the invention. The packaging material is fed over folding shoe 3 and between folding rollers 4 so that opposed portions 5 and 6 of the packaging material are folded around the upper surface of the shoe 3 so that the edges thereof meet along a longitudinally extending line in the center of the shoe 3.

Rollers 8 and 9 are provided with peripherally disposed transverse crimping bars 8a and 9a. The rollers 8 and 9 are mechanically mounted for rotation so that these transverse bars coincide with each other in complementary engagement when rotated through the plane intercepting the axes of the rollers 8 and 9. The rollers 8 and 9 are provided with electrical heating elements 10 and 11 so that the bars 8a and 9a are heated to a desired and predetermined temperature. Notching knives 22 are provided in the crimping bars 8a and engage with corresponding depressed portions of the crimping bars 9a.

The rollers 8 and 9 are rotated by suitable motor driven driving means to draw the packaging material including the folded over portions 5 and 6 so as to make space-transversed crimped and sealed areas 12 extending across the packaging structure. It will be noted that during the sealing process, notches are provided in the center of the sealing areas 12 and in alignment with the longitudinal center line of the packaging construction. After leaving the rollers 8 and 9, and after passing between stripper idler elements 13, the package structure is folded over a folding shoe 14 aligned with the center of the packaging structure, and extending perpendicular to the plane of the shoe 3. As the packaging structure is now moved, it is pulled over the shoe 14 so that the folded over portions 5 and 6 pass through rollers 15 and 16, respectively. In this last folding operation, the portions 5 and 6 produce, in effect, a plurality of bag pockets 5a, 5b, and 6a, 6b, et cetera. These bags or pockets are formed by virtue of the now vertically extending sealing areas 12, the bottom of the bags being formed by the folding of the packaging material and the upper portion of the bag being opened to form a mouth. It will be noted that this folding operation, in transferring the packaging structure from a horizontal plane to a vertical plane, tends to cause the mouth of the bags so formed to distend. However, a motor driven opener 18 is provided for further distending the mouths of these bags, including elements for insertion into the upper part of the bag structure in timed relation with the movement of the bags along the shoe 14.

The bag structure passes under filling units 20 and 21 disposed above and on opposite sides of the shoe 14. Filling units 20 and 21 are connected with a supply of the commodity to be inserted in the bag, such as coffee, tea, chocolate, pharmaceutical elements, and the like. Each of the filling units 20 and 21 is provided with a closure member for regulating the flow of the commodity. These closure members are operated by rods 23 suitably connected with the driving mechanism for filling each of the bags with the desired amount of the commodity as the bags pass under the filler units 20 and 21.

After being filled, the packaging structure passes against a knife element 25 which splits the packaging structure into two half portions 26 and 27, as shown in Figs. 1 and 2. The chain of open bags comprising the half portion 26 then passes through crimping rollers 28 and 29 and the chain of open bags comprising the half portion 27 extends through rollers 30 and 31. These rollers are electrically heated and put crimped edge seal 32 along the top of the packaging structure to close the bags or pockets. All of the sealing and crimping operations are attended by sufficient heat to fuse the thermoplastic material on the regenerated cellulose or other packaging material, while the crimping operation interdigitates opposed layers of packaging material to lock the same in a secure bond.

Fig. 3 represents more clearly the exact details of the completed packaging chain unit. It will be seen that individual bags are formed between the sealing areas 12 and that the top sealing area 32 completely seals the bags, after the bags have been filled by the commodity 33. The notches 34 in the center of the sealing areas 12 permit the individual bags to be separated from the chain unit. When desired, the sealing area 12 may be provided with a centrally disposed row of perforations 35 to assist in the separation of the individual bag units, one from the other. These perforations may be provided by teeth centrally disposed on the crimping bars 8a of the roller 8, meshing with complementary recesses or resilient section in the roller 9.

Although a preferred arrangement for forming and filling bags has been disclosed, it will be recognized that various changes and equivalent forms can be made without departing from the intended scope of the invention. Therefore, no limitations are intended except as pointed out by the scope of the appended claims.

What is claimed as new and original to be secured by Letters Patent of the United States is:

1. Bag forming apparatus comprising, means for feeding a strip of sealable packaging material, means for folding said strip longitudinally, forming means for sealing said folded material transversely to pre-form a chain of bag pockets, means displaced from said forming means for filling said pockets after they have been pre-formed and means for sealing the mouth of said pre-formed and filled pockets to close said pockets into unitary bag structures.

2. Bag forming apparatus comprising, means for feeding sealable strip packaging material with opposite edges folded over into adjacent layers, means for sealing together said folded layers of material transversely of said strip at spaced intervals to provide a plurality of adjacent bag pockets extending along said strip with the bottoms of said bag pockets lying along the outside edges of said folded strip and having open mouths for said bags to permit insertion of commodities therein, and means for sealing the mouths of said bags upon completion of a commodity insertion operation.

3. Apparatus in accordance with claim 2 including means for centrally slitting said strip formation intermediate said turned-over edges to separate adjacent chains of said pocket formations.

4. Bag forming apparatus comprising, means for feeding opposed layers of sealable packaging material, means for sealing together said layers at successive points to produce a chain of pre-formed open mouth pockets subject to a commodity filling operation and including means for distending the open mouths of said pockets to receive a commodity, and means for sealing the open end of said bag pockets.

5. A packaging machine comprising, means for feeding a strip of packaging material including a means for folding over the edges of said strip to form plural longitudinally extending folded-over portions, means for producing spaced transverse seals across said folded-over portions, means included in the feeding means for further folding said material, after said sealing operation, and longitudinally between said folded-over portions to produce contiguous and parallel chains of open mouthed bags, means for filling said bags, and means for subsequently closing the mouths of said bags.

6. Packaging apparatus for forming and filling bags comprising, means for feeding and sealing together opposed layers of packaging material to pre-form open mouth bag structures, a commodity filling device, means for feeding a series of said open mouth bags adjacent said commodity filling device, and means for sealing the mouths of said bags, after passing adjacent said filling device, to form commodity packages.

LEROY L. SALFISBERG.